No. 807,457.  
PATENTED DEC. 19, 1905.  
B. A. GRAMM.  
DRIVING ATTACHMENT FOR AUTOMOBILES.  
APPLICATION FILED JULY 28, 1905.
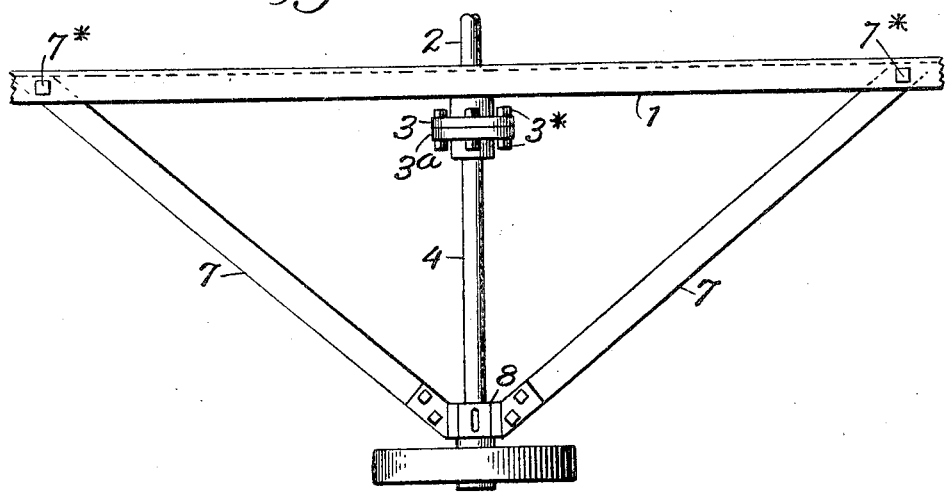
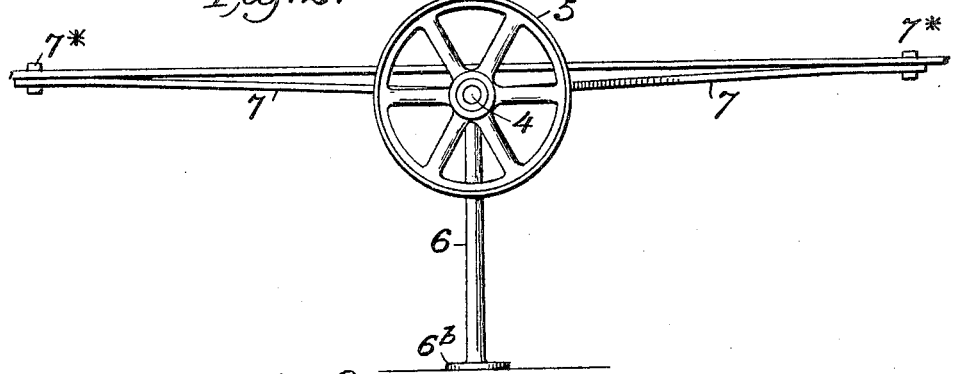
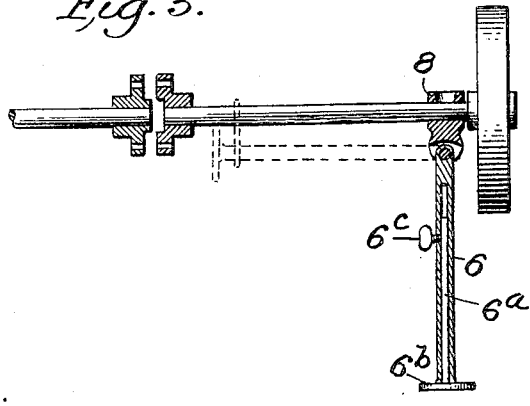
WITNESSES:
James F. Duhamel
Aloysius McCarthy
INVENTOR:
Benjamin A. Gramm
By his Attorney
James Hamilton

UNITED STATES PATENT OFFICE.

BENJAMIN A. GRAMM, OF CHILLICOTHE, OHIO.

DRIVING ATTACHMENT FOR AUTOMOBILES.

No. 807,457.　　　Specification of Letters Patent.　　　Patented Dec. 19, 1905.

Application filed July 28, 1905. Serial No. 271,652.

*To all whom it may concern:*

Be it known that I, BENJAMIN A. GRAMM, a citizen of the United States, residing in Chillicothe, in the county of Ross and State of Ohio, have invented certain new and useful Improvements in Driving Attachments for Automobiles, of which the following is a specification, reference being had to the accompanying drawings.

My invention relates to improvements in devices which are designed to transmit power from the main shaft of an automobile to some other piece of machinery—as, for example, a power-pump, a sawmill, a grist-mill, or the like.

The object of my invention is to provide an apparatus which may be easily attached to or detached from the main shaft and frame of the automobile and which may be readily transported when not in use.

In the drawings illustrating the principle of my invention and the best means now known to me of applying that principle, Figure 1 is a plan view showing my new attachment coupled to the automobile. Fig. 2 is a side elevation of what is shown in Fig. 1, and Fig. 3 is a sectional view through the shaft 4.

Beyond the frame 1 of the automobile projects the main shaft 2 thereof, which is provided with a coupling-head 3, adapted to be secured by the bolts 3* with the coöperating coupling-head 3ª, fast upon the inner end of the shaft 4 of the attachment. This shaft 4 is journaled in the box 8, to which are suitably secured the side braces 7 7, the free ends of which are provided with bolt-holes through which and coöperating holes in the frame 1 are passed bolts 7*.

To the box 8 is pivoted the swinging support 6, within which telescopically slides the post 6ª, provided with a foot 6ᵇ and held in its adjusted position by the set-screw 6ᶜ. By means of the adjustable support thus provided the operator is enabled to keep the shaft 4 in line with the main shaft 2, and thus to relieve the bearings of undue friction. The pulley 5 is belt-connected with the apparatus to be driven, and it is obvious that a sprocket wheel and chain may be substituted for the pulley 5 and a belt. The pulley projects far enough beyond the frame of the automobile to insure that the belt clears the wheels of the automobile.

When it is desired to use the automobile for its ordinary purpose, the support or leg 6, with the post 6ª, is swung up alongside of the shaft 4 of the attachment and secured thereto, the coupling-heads 3 and 3ª are released from each other by removing the bolts 3*, and the braces 7 7 are unbolted from the frame 1. The attachment is light and is readily adjustable in place upon the automobile and as easily detached therefrom and transported.

What I claim is—

1. The combination with the frame and driving mechanism of an automobile, a shaft readily attachable to and detachable from said mechanism; and a support for said shaft readily detachable from and attachable to the outside of said frame.

2. The combination with the frame and driving mechanism of an automobile, a shaft readily attachable to and detachable from said mechanism; braces readily attachable to and detachable from said frame for supporting the outer end of said shaft; and a support adapted to rest upon the ground for maintaining said shaft in correct alinement.

3. The combination with the frame and driving mechanism of an automobile, a shaft readily attachable to and detachable from said mechanism; said shaft extending beyond said frame; and a support for the outer free end of said shaft; said support being adapted to rest upon the ground.

4. The combination with the frame and driving mechanism of an automobile, a shaft readily attachable to and detachable from said mechanism, said shaft extending outside of said frame; and a journal-box having pivoted thereto a swinging leg adapted to fold up alongside of said shaft when not in use.

5. The combination with the frame and driving-shaft of an automobile, said shaft projecting beyond the outside of said frame; a shaft adapted to be coupled to the said driving-shaft; and an extensible support for the last-named shaft.

6. The combination with the frame and driving-shaft of an automobile, said shaft projecting beyond the outside of said frame and being provided with a coupling-head; a shaft provided with a coöperating coupling-head for attachment to said driving-shaft; a journal-box connected by braces with said frame; said braces readily attachable to and detachable from said frame; and a foldable extensible support for said journal-box.

BENJAMIN A. GRAMM.

Witnesses:
H. G. HOWARD,
H. T. HERMANN.